US011003690B1

(12) United States Patent
O'Shea

(10) Patent No.: US 11,003,690 B1
(45) Date of Patent: May 11, 2021

(54) AGGREGATOR SYSTEMS FOR STORAGE OF DATA SEGMENTS

(71) Applicant: Amazon Technologies, Inc., Seattle, WA (US)

(72) Inventor: John O'Shea, Borris (IE)

(73) Assignee: Amazon Technologies, Inc., Seattle, WA (US)

( * ) Notice: Subject to any disclaimer, the term of this patent is extended or adjusted under 35 U.S.C. 154(b) by 332 days.

(21) Appl. No.: 14/921,980

(22) Filed: Oct. 23, 2015

(51) Int. Cl.
*G06F 16/27* (2019.01)
*G06F 16/22* (2019.01)
*G06F 16/23* (2019.01)

(52) U.S. Cl.
CPC ........ *G06F 16/278* (2019.01); *G06F 16/2228* (2019.01); *G06F 16/2365* (2019.01)

(58) Field of Classification Search
CPC ................................................ G06F 17/30584
See application file for complete search history.

(56) References Cited

U.S. PATENT DOCUMENTS

| 2002/0099691 | A1* | 7/2002 | Lore ................. G06F 17/30324 |
| 2009/0174815 | A1 | 7/2009 | Hellwagner et al. | |
| 2010/0268808 | A1* | 10/2010 | Chkodrov ........... G06F 11/2028 709/223 |
| 2014/0032566 | A1* | 1/2014 | Agarwal ........... G06F 17/30011 707/741 |
| 2014/0108309 | A1 | 4/2014 | Frank et al. | |
| 2016/0078663 | A1 | 3/2016 | Sareen et al. | |
| 2016/0110125 | A1* | 4/2016 | Orme .................. G06F 12/0238 711/102 |
| 2017/0097914 | A1* | 4/2017 | Craddock ............. G06F 13/366 |

OTHER PUBLICATIONS

"Auto Scaling: Developer Guide API Version Jan. 1, 2011," Amazon Web Services, Jan. 1, 2011, 278 pages.

* cited by examiner

*Primary Examiner* — Mark D Featherstone
*Assistant Examiner* — Tony Wu
(74) *Attorney, Agent, or Firm* — Davis Wright Tremaine LLP

(57) ABSTRACT

An aggregator system obtains a first set of measurements from a logical partition of a computing resource monitoring service. The aggregator system aggregates this first set of measurements with a second set of measurements obtained from a storage resource. Using these measurements, the aggregator system generates a data segment that corresponds to a time interval of both the first set of measurements and the second set of measurements. The aggregator system stores this data segment in the storage resource and updates an index to indicate the location in the storage resource where the data segment is stored.

18 Claims, 10 Drawing Sheets

AGGREGATOR SYSTEMS FOR STORAGE OF DATA SEGMENTS

CROSS REFERENCE TO RELATED APPLICATIONS

This application incorporates by reference for all purposes the full disclosure of co-pending U.S. patent application Ser. No. 14/921,851, filed concurrently herewith, entitled "ARCHIVAL DATASTORE FOR AGGREGATED METRICS."

BACKGROUND

Customers and administrators of a computing resource service provider, as well as other users of computing resources of the computing resource service provider often utilize monitoring services to measure, diagnose, and improve how they operate their computing resources. For instance, through these monitoring services, customers, administrators, and other users can obtain data for their computing resources and use this data to determine whether their computing resources are functioning properly. If their computing resources are not functioning properly, the data can be used to identify and enable customers, administrators, and other users to troubleshoot any issues that may be present. However, monitoring services often process a significant volume of data over time resulting in a need to increase storage capacity for this data and to provide the data to customers in response to their requests. Conventional techniques for monitoring computing resources often result in significant latencies between when data indicative of an issue is obtained and when that data is available for consumption. Some customers, administrators, and other users may need to acquire data with minimal latency in order to determine whether an adjustment to the way their resources are operating is needed. However, most techniques utilized to reduce latency can result in inefficiencies and substantially higher infrastructure costs.

BRIEF DESCRIPTION OF THE DRAWINGS

Various embodiments in accordance with the present disclosure will be described with reference to the drawings, in which.

DETAILED DESCRIPTION

Figure 1:
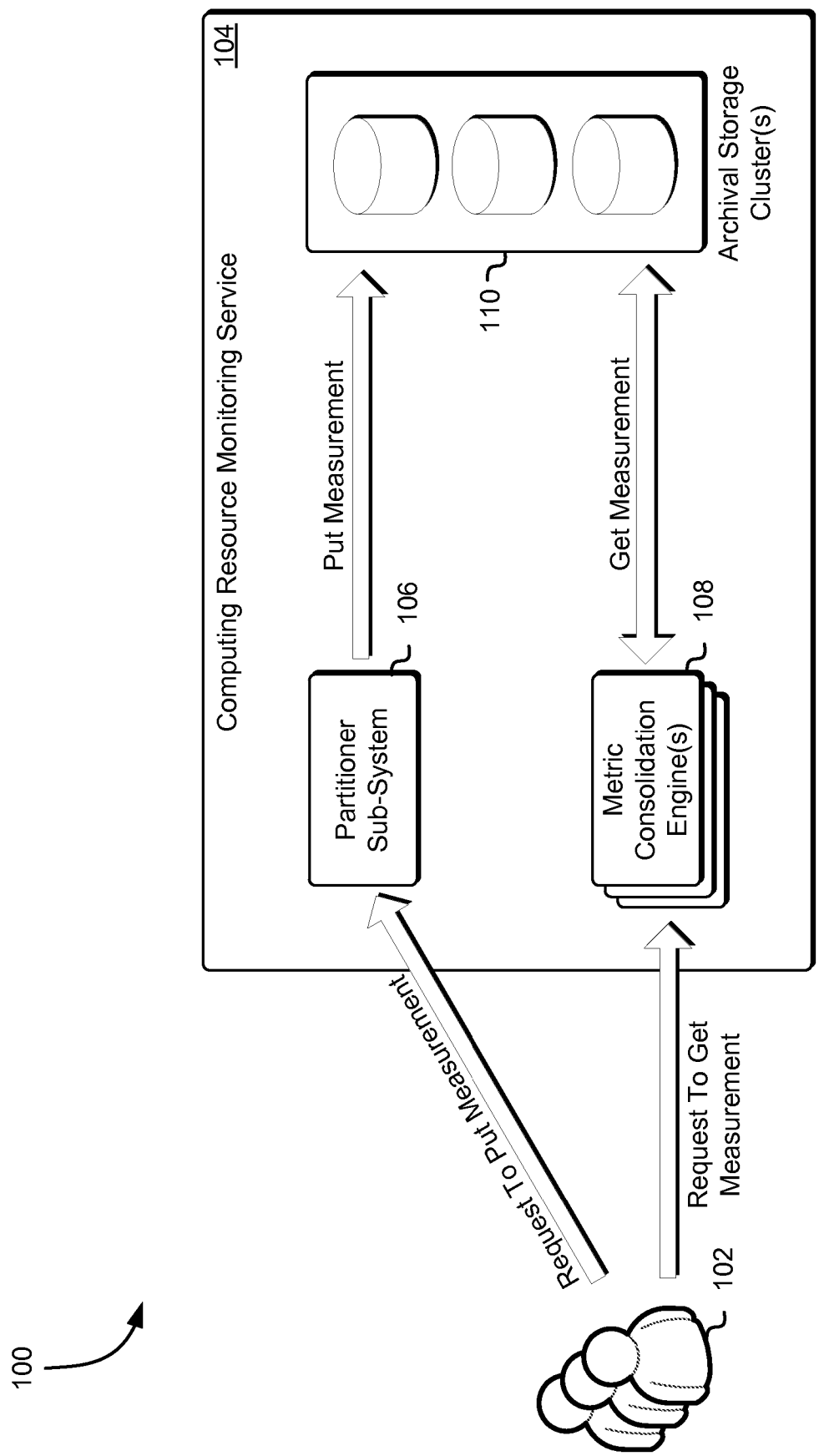
FIG. 1 shows an illustrative example of an environment in which various embodiments can be implemented.

This disclosure relates to a computing resource monitoring service that is configured to aggregate measurements for metrics and to store large volumes of aggregated measurements in an archival storage cluster. The computing resource monitoring service may include a front-end server, which may be configured to obtain measurements from a variety of different sources, including customers of the computing resource service provider, various other services of the computing resource service provider, and computing resources made available to the customers through the various services. This front-end server may transform these measurements into a binary serialization format that can be used by the various components of the computing resource monitoring service. Once the transformation of the measurements is completed, the front-end service may publish these measurements to a partitioner sub-system to divide the measurements based on an identifier, such as a fully qualified metric identifier (FQMI), for each measurement and the timestamp for the measurement for distribution to various aggregator systems.

In some examples, the partitioner sub-system obtains a mapping of measurements to the various aggregator systems to determine how the measurements are to be partitioned. Based on this mapping, the partitioner sub-system may provide these partitioned measurements to the identified aggregator systems, which may be configured to ingest a certain amount of data over a period of time. In response to receiving partitioned measurements from the partitioner sub-system, an aggregator system may aggregate the received measurements with existing measurements into various data points that are then stored within a corresponding data store. The aggregator system may generate and maintain a measurement index that may be used to specify where the measurements are stored within the data store such that the computing resource monitoring service may refer to this index to locate the measurements in the event of a request to retrieve the measurements. Thus, when new measurements are stored within the data store, the aggregator system may update this index to indicate where in the data store these new measurements are stored.

In addition to the aggregator system that obtains measurements from the partitioner sub-system, the computing resource monitoring service may further maintain a variety of secondary aggregator systems. These secondary aggregator systems may be configured to re-process aggregated measurements stored in the data store that correspond to at least two consecutive time periods. For instance, a secondary aggregator system may be configured to be responsible for a particular time period that is older and longer than the time period of the aggregator system that obtains measurements from the partitioner sub-system. The secondary aggregator system may obtain, from the data store, any aggregated measurements corresponding to its designated time period and further aggregate these measurements into a larger data segment that includes measurements for the longer time period. The secondary aggregator system may maintain its own index, which may be used to track the location of the larger data segment within its data store or within the archival storage cluster. In some examples, the computing resource monitoring service may maintain various secondary aggregator systems that may be interrelated to continuously generate larger data segments corresponding to older and longer time periods up to a maximum measurement retention period. Once a measurement has reached this maximum possible retention period, the measurement may be archived in a separate data system or otherwise purged.

When a customer of the computing resource service provider submits an API call to the front-end server to retrieve measurements from the computing resource monitoring service (e.g., GET, etc.), the front-end server may transmit a request to the aggregator systems to obtain the measurements. This may cause the various aggregator systems to each access a metric mapping registry to determine where the requested measurements are stored. The aggregator systems may then access their respective aggregator data stores to obtain the requested measurements and provide these measurements to a metric consolidation engine. This metric consolidation engine may compile the measurements from the aggregator systems and provide these measurements to the front-end server. The front-end server may fulfill the customer's request by providing the compiled measurements from the metric consolidation engine. In some alternative examples, the front-end server may evaluate the metric mapping registry to identify the archival storage clusters that have the required measurements and identify the aggregator systems that have stored the measurements within their respective data stores. Thus, the front-end server may transmit a request to the identified aggregator systems to obtain the requested measurements.

In this manner, the computing resource monitoring service may ingest measurements for various metrics from a variety of sources, aggregate these measurements for storage in a variety of archival storage clusters, and provide measurements to customers, administrators, and other entities to enable metrics evaluation in a short amount of time. In addition, the techniques described and suggested herein facilitate additional technical advantages. For example, because measurements ingested by the computing resource monitoring service are aggregated into larger data segments based on the relative time period in which the measurements were collected, measurements may be stored within fewer individual data segments within the archival storage clusters. This may reduce the required operations to obtain any measurements from the archival storage clusters as fewer data segments may be needed to fulfill customer requests for aggregated measurements.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 shows an illustrative example of an environment 100 in which various embodiments can be implemented. In the environment 100, one or more customers 102 (e.g., individuals, organizations, automated processes, computing resource agents, etc.) of a computing resource service provider may submit a request to a computing resource monitoring service 104 to store a measurement of a particular metric for a computing resource. The request to store the measurement may be provided in the form of an API call to the computing resource monitoring service 104, such as a PUT call. In an embodiment, the initial request to store the measurement includes metadata that can be used to describe the measurement that is being provided to the computing resource monitoring service 104. For instance, the metadata may specify the name of the originating computing resource that has generated the data, an auto-scaling group to which the originating computing resource belongs to, a virtual machine image identifier for the originating computing resource, and the like. Upon receiving the measurement and the metadata through the API call to store the measurement, the computing resource monitoring service 104 may generate a hash of the metadata, which may be used to index the measurement upon storage. A measurement may be a numerical value from a scale of possible values, a Boolean value, or an alphanumeric or other indicator of a state of a set of possible states. The measurement may further serve as an indication of at least one aspect of the operation of an associated computing resource, such as virtual machine instances, customer computer systems, object-based datastores and/or other computing resources. For instance, measurements may include processor usage over time, memory usage over time, a count for errors detected within a computing resource over a period of time, and the like.

In an embodiment, the computing resource monitoring service 104 includes a partitioner sub-system 106 for storage of the measurement. The partitioner sub-system 106 may include one or more computer systems of the computing resource monitoring service 104 that may be configured to partition received measurements into one or more logical partitions, as will be described below. When the computing resource monitoring service 104 obtains the measurement from a customer 102, the computing resource monitoring service 104 may utilize the provided metadata to identify the computing resource that has generated the data and determine where this computing resource is located. Based at least in part on this determination, the computing resource monitoring service 104 may select a corresponding storage location within an archival storage cluster 110 for storage of the data. While archival storage clusters are used extensively throughout the present disclosure for the purpose of illustration, other archival storage resources may be used for storage of the data. For instance, the computing resource monitoring service 104 may maintain and operate one or more servers and/or storage devices that may be used to store this data.

The metadata for the measurement provided to the computing resource monitoring service 104 may uniquely identify the particular metric for the measurement. For instance, the metadata may uniquely identify the measurement by a combination of a customer account number, the namespace (e.g., associated service for the computing resource), the dimensions for the measurement (e.g., key/value pairs), the name of the measurement itself, and the like. In an embodiment, when the computing resource monitoring service 104 receives the measurement and metadata from the customer 102, the computing resource monitoring service 104 utilizes a hash function to generate a hash of the metadata, which can be used as an identifier for the measurement that is to be stored. Further, the computing resource monitoring service 104 may utilize a binary serialization format to compress the measurement to be stored. In this binary serialization format, the serialized measurement may include the identifier generated by hashing the metadata, the timestamp for the data, the unit of measurement for the data, and the measurement itself. In an alternative embodiment, the customer 102, through use of a customer computer system or other computing resource, calculates the identifier based at least in part on the metadata for the measurement. This may enable the customer 102 to provide the measurement with the identifier for the measurement without requiring the computing resource monitoring service 104 to generate the identifier itself.

Once the computing resource monitoring service 104 has transformed the measurement into a serialized format, the computing resource monitoring service 104 may transmit the measurement to the partitioner sub-system 106. In an embodiment, the partitioner sub-system 106 determines, based at least in part on the identifier and the timestamp for the measurement, which logical partition of a plurality of logical partitions will be used for storing the measurement. For various measurements received, the partitioner sub-system 106 may split these various measurements into various logical partitions further based at least in part on a mapping of storage classes to logical partitions and archival storage clusters 110. For instance, the partitioner sub-system 106 may determine, based at least in part on an account identifier of the customer 102, a storage class for each of the provided measurements. The partitioner sub-system 106 may utilize the mapping to identify the one or more logical partitions where the measurements may be stored and the destination archival storage clusters for the measurements. To obtain this mapping, the partitioner sub-system 106 may access a metric mapping registry, which may provide a mapping of logical partitions to the one or more archival storage clusters 110 made available by the computing resource monitoring service 104. The partitioner sub-system 106 may store the measurement within the identified logical partitions and add a new measurement storage job to a queue that may be accessed by one or more aggregator systems for storage of the measurements to the specified one or more aggregator systems 110.

The queue may include various measurement storage jobs, which may be prioritized based at least in part on the timestamps for the measurements to be stored within the archival storage clusters 110. For instance, jobs corresponding to older measurements may be given greater priority in order to ensure that these older measurements are made available as soon as possible and prevent any backlog. An aggregator system may access the queue and obtain a measurement storage job, which may specify the logical partition that includes the measurements and the destination one or more archival storage clusters for these measurements. The aggregator systems of the computing resource monitoring service 104 may be stateless in that the aggregator systems may compete with each other to process the measurements for a given retention period within a logical partition.

An aggregator system is a key-value storage system that may be optimized for aggregating measurements and serving time series measurement data for various metrics. In an embodiment, an aggregator system will ingest measurements from a logical partition having a corresponding time period. For instance, the aggregator system may ingest measurements in real time (e.g., synchronously as the measurements are received). The aggregator system may aggregate, in memory, these measurements into a number of data points that may be stored within an archival storage cluster 110. The archival storage cluster 110 may include one or more logical data containers that can be utilized to store aggregated measurements. The aggregator system may also maintain an index of the processed measurements. For instance, as the aggregated measurements are stored within the archival storage cluster 110, the aggregator system may update the index to indicate where the aggregated measurements are stored within the archival storage cluster 110. In some embodiments, the aggregator system is responsible for maintaining an index corresponding to measurements received during a particular time period. For instance, the aggregator system may be responsible for maintaining an index corresponding to measurements having a timestamp less than one day in the past.

In an embodiment, the computing resource monitoring service 104 maintains one or more secondary aggregator systems configured to reprocess existing measurements stored within the archival storage cluster 110 and corresponding to time periods older than the time period assigned to the aggregator system. These one or more secondary aggregator systems may merge older measurements from two or more consecutive time periods into a larger data segment that corresponds to an older and longer time period. For instance, if the original aggregator system tracks measurements over a day (e.g., −1 day) within its index, a secondary aggregator system may obtain measurements corresponding to two subsequent days (e.g., −2 days and −3 days) and merge these measurements into a wider data segment for these measurements corresponding to these two subsequent days (e.g., −2/−3 days). The secondary aggregator system may maintain its own index corresponding to this wider and older time period and may store the newly generated data segment within the archival storage cluster 110.

The computing resource monitoring service 104 may include various secondary aggregator systems configured to continuously process older measurements corresponding to consecutive time periods into larger data segments until a maximum retention period is reached. For instance, a secondary aggregator system may be responsible for 2-day segments, while another secondary aggregator system may be configured to obtain older, consecutive 2-day data segments from the archival data cluster 110 and generate new 4-day data segments. This secondary aggregator system may also maintain its own index corresponding to the older 4-day retention period that may be used to locate the corresponding data segments from within the archival storage cluster 110.

At any time, a customer 102 of the computing resource service provider may transmit a request to the computing resource monitoring service 104 to retrieve any number of measurements from the various archival storage clusters 110. The request to retrieve the measurements may be provided in the form of an API call to the computing resource monitoring service 104, such as a GET call. In order for the computing resource monitoring service 104 to obtain the measurements necessary to fulfill the request, the customer 102 may be required to provide the metadata for the measurements that are to be obtained. This may enable the computing resource monitoring service 104 to hash the metadata to obtain the one or more identifiers for the measurements. The computing resource monitoring service 104 may utilize the one or more identifiers to identify, from the metric mapping registry, the one or more locations of the measurements for the one or more current retention periods.

Upon determining the locations where the requested measurements are stored, the computing resource monitoring service 104 may utilize a mapping from the metric mapping registry to identify one or more metric consolidation engines 108 that correspond to the locations where the requested measurements are stored. The computing resource monitoring service 104 may utilize these identified metric consolidation engines 108 to transmit requests to the appropriate aggregator systems 110 to obtain the measurements necessary to fulfill the GET request. The metric consolidation engines 108 may be a plurality of computer system modules of the computing resource monitoring service 104, which may include a client library to enable the modules to read measurements from the various archival storage clusters 110. In response to the request from the one or more metric consolidation engines 108, the aggregator systems may evaluate their respective indices to determine where within the archival storage clusters 110 the requested measurements are stored. When the one or more metric consolidation engines 108 have obtained the measurements from the various aggregator systems, the measurements may be compiled to generate a measurement response. The one or more metric consolidation engines 108 may provide the measurement response to the GET request in the form of the measurements in a de-serialized format that may be used by the customer 102 for its own purposes.

Figure 2:
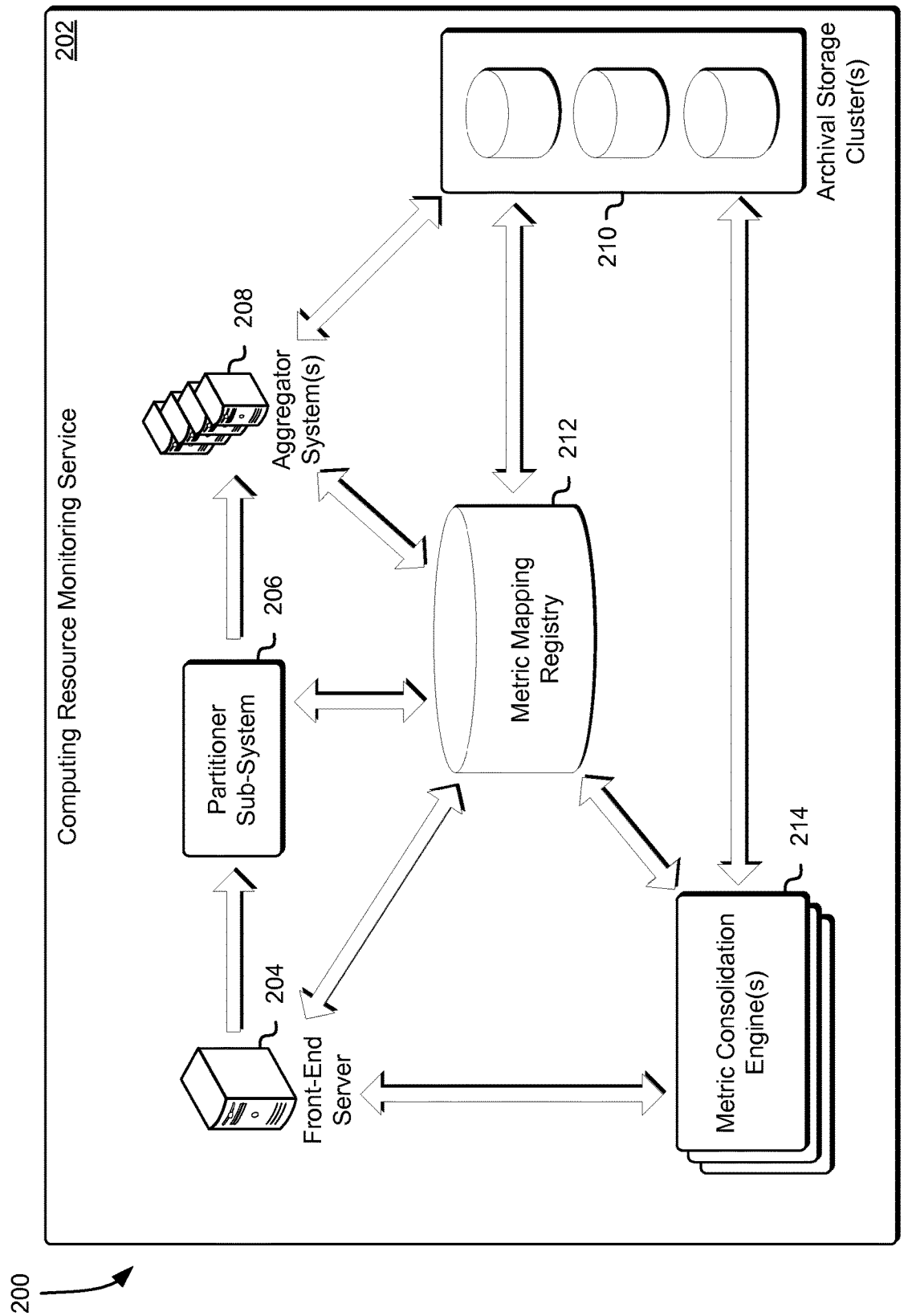
FIG. 2 shows an illustrative example of an environment in which a front-end server of a computing resource monitoring service processes one or more application programming interface calls to store and retrieve measurements from the service in accordance with at least one embodiment.

As noted above, a computing resource monitoring service may obtain measurements from customers, administrators, computing resources, and other entities and store these measurements within one or more aggregator data stores over a particular retention period as defined by the service. The measurements obtained by the computing resource monitoring service may be aggregated as it arrives in real time. Accordingly, FIG. 2 shows an illustrative example of an environment 200 in which a front-end server 204 of a computing resource monitoring service 202 processes one or more API calls to store and retrieve measurements from the service 202 in accordance with at least one embodiment.

In the environment 200, a front-end server 204 of the computing resource monitoring service 202 may receive a PUT request from a customer computer system to store a measurement within an archival storage cluster 210. The customer computer system may be a computer system hosted by a computing resource service provider but managed by a customer. Alternatively, the customer computer system may include computer systems and resources hosted by a customer in its own datacenters. The PUT request may include a measurement for a particular metric at a given timestamp. Additionally, the PUT request may further include metadata for the provided measurement. This metadata may include one or more metric attributes that may uniquely identify the associated measurement and metric within the computing resource monitoring service 202. For instance, the metadata may specify, individually or in combination, the account number of a customer associated with the customer computer system submitting the PUT request or with another computing resource responsible for generation of the measurement, the name of the particular service responsible for managing the computing resource (e.g., virtual computer system service, database service, etc.), the dimensions for the measurement (e.g., key/value pairs), and an identifier for the computing resource producing the measurement.

In response to receiving the PUT request from the customer computer system, the front-end server may obtain the metadata from the PUT request and utilize a hash function to generate an identifier for the measurement that is to be stored within an archival storage cluster 210. Additionally, the front-end server 204 may transform the measurement into a serialized format for publication to a partitioner sub-system 206. The serialized format for a particular measurement obtained from the customer computer system may include the identifier, the timestamp for the measurement, the unit of measurement for the measurement, and the measurement itself. The front-end server 204 may spool unpartitioned measurements from various PUT requests for asynchronous delivery to the partitioner sub-system 206.

In an embodiment, the front end server 204 sends the serialized measurement generated based at least in part on the received PUT request to the partitioner sub-system 206 for storage of the measurement. The partitioner sub-system 206 may include one or more computer systems collectively configured to partition measurements for various metrics based at least in part on the identifier and timestamp of each measurement for delivery to the one or more aggregator systems 208. The partitioner sub-system 206, upon obtaining the measurement from the front-end server 204, may access a metric mapping registry 212 to obtain a mapping of logical partitions to logical data containers of the archival storage clusters 210. The metric mapping registry may include a database for the mapping and one or more computer systems for creating the partition schedules based at least in part a storage class that is determined based at least in part on an account identifier for the customer computer system. For instance, the metric mapping registry 212 may evaluate the obtained request to identify the account identifier of the customer computer system to determine the storage class for the obtained measurements. This evaluation may be used to generate the partition schedule for placement of the obtained measurements into a corresponding logical partition based at least in part on the storage class. The storage class for the measurements may further be used to identify the archival storage cluster 210 to be used for storage of the received measurements. In some embodiments, the partition schedule can be updated manually in order handle emergent issues with aggregator system 208 availability, required throughput for storage of the measurements, and other issues.

The partitioner sub-system 206 may utilize the mapping from the metric mapping registry 212 to determine, for each measurement, a destination logical partition for storage of the measurement. The partitioner sub-system 208 may select, based at least in part on the identifier and timestamp of the measurement obtained through the PUT request, a logical partition from the plurality of logical partitions for storage of the measurement. As noted above, the identifier may be created using a hash function to hash the metric attributes provided in the metadata. For instance, the identifier may include a multiple-byte hash, wherein a portion of the hash is used to determine the logical partition for each measurement metric, while another portion of the hash is used for unique identification of the measurement within the logical partition. This logical partition may be mapped based at least in part on the storage class of the measurement by the metric mapping registry 212.

In an embodiment, the mapping stored within the metric mapping registry 212 is provided (via a user interface of an associated computing device) by an administrator or other privileged user of the computing resource monitoring service 202. For instance, an administrator or other privileged user may upload one or more configuration files to the metric mapping registry 212 that are to serve as the mapping. These configuration files may be updated to update the mapping stored within the metric mapping registry 212. In another embodiment, the computing resource monitoring service includes an interface, such as a graphical user interface (GUI), which may be accessible to administrators and other privileged users of the computing resource monitoring service 202 to generate the one or more mappings in the metric mapping registry 212. For instance, through the GUI, an administrator or other privileged user may configure and define the mapping based at least in part on the logical containers and archival storage clusters available within the service. In yet another embodiment, the computing resource monitoring service 202 is configured to automatically modify an existing mapping within the metric mapping registry 212 as a result of one or more logical containers and/or archival storage clusters being made available through the service. Further, the mapping may be automatically updated if there are any issues preventing normal operation of any logical containers and/or archival storage clusters, including, but not limited to, unavailable capacity or hardware failures.

The computing resource monitoring service 202 may maintain one or more aggregator systems 208 configured to ingest measurements collected over a period of time from the various logical partitions generated by the partitioner sub-system 206. Each aggregator system 208 may be configured to compete for each measurement storage job when a logical partition has been populated with new measurements. For instance, when a logical partition is populated with new measurements, the partitioner sub-system 206 may generate a new measurement storage job and add the operation to a priority queue. The aggregator systems 208 may refer to this queue to obtain an operation and perform the requested measurement storage job.

An aggregator system 208, in response to ingesting partitioned measurements for a particular period of time, may aggregate, in memory, the measurements into distinct data points. Each of these data points may correspond to different time intervals (e.g., one minute, five minutes, one hour, etc.). The aggregator system 208 may store these measurements within the archival storage cluster 210 identified in the mapping from the metric mapping registry 212 and generate an index to specify where, within the cluster 210, the aggregated measurements are stored. In some embodiments, the aggregator system 208 obtaining the measurements from a logical partition is configured to maintain an index for a particular time interval. For instance, the aggregator system 208 may be configured to store measurements into a data segment corresponding to a time interval from the present time (e.g., measurements obtained within one day of the present time, etc.). The index generated by this aggregator system 208 may further correspond to the time interval from the present time.

In an embodiment, the computing resource monitoring service 202 maintains one or more secondary aggregator systems configured to re-process aggregated measurements in distinct data segments from two or more consecutive time periods into a larger data segment. This larger data segment may correspond to an older time interval (e.g., older than one day from the present time, etc.). For instance, a secondary aggregator system may obtain data segments corresponding to two days and three days from the present time stored within the archival data cluster 210 and merge these data segments into a larger data segment comprising measurements obtain between two to three days from the present time. Similarly, the computing resource monitoring service 202 may configure another secondary aggregator system to obtain these larger data segments for two or more consecutive time periods that are older than the two to three day period and generate a larger data segment from these data segments. This process of continuously generating larger data segments may continue until a maximum retention period is reached. Measurements having timestamps older than this maximum retention period may be purged. Each secondary aggregator system may maintain its own distinct index specifying the location of their respective data segments within the archival storage cluster 210.

At any time, the front-end server 204 may receive a GET request from a customer computer system, computing resource, administrator, or other authorized entity to retrieve measurements for a particular metric from the archival storage clusters 210. The GET request may include metadata for the measurements to be obtained from the computing resource monitoring service 202, which may be similar to metadata provided at an earlier time to store a measurement for the metric. The front-end server 204 may hash the received metadata to generate an identifier that can be used to locate the measurements being sought. In an embodiment, the front-end server 204 obtains a mapping of metric consolidation engines 214 to archival storage clusters 210 from the metric mapping registry 212 to determine which metric consolidation engines 214 are to be utilized to obtain the requested measurements. For instance, the front-end server 204 may utilize the identifier to identify in which archival storage clusters 210 the measurements are stored. Using this information, the front-end server may utilize the mapping from the metric mapping registry 212 to identify the one or more metric consolidation engines 214 that correspond to the archival storage clusters 210 where the measurements are stored. The front-end server 204 may transmit a query, along with the identifier, to the identified one or more metric consolidation engines 214 in order to obtain the measurements required to fulfill the GET request. In response to the query, the one or more metric consolidation engines 214 may access the metric mapping registry 212 to determine where the measurements needed to fulfill the GET request are stored.

In order to determine the archival storage clusters 210 that have the measurements necessary to fulfill the GET request, the one or more metric consolidation engines 214 may provide the identifier to the metric mapping registry 212. The metric mapping registry 212 may analyze the mapping of storage classes to logical partitions and archival storage clusters 210 for a retention period to determine where the measurements are stored. Once the one or more metric consolidation engines 214 determine, based at least in part on the information provided by the metric mapping registry 212, the archival storage clusters 210 where the measurements are stored, the one or more metric consolidation engines 214 may access the archival storage clusters 210 to obtain the requested measurements. For instance, a metric consolidation engine 214 may utilize the mapping from the metric mapping registry 212 to identify the indices from the various aggregator systems. These indices may be used to determine where the data segments including the requested measurements are stored within the archival storage clusters 210. The one or more metric consolidation engines 214 may utilize this information to obtain the requested measurements. This may cause the one or more metric consolidation engines 214 to compile the obtained measurements for delivery to the customer computer system.

Figure 3:
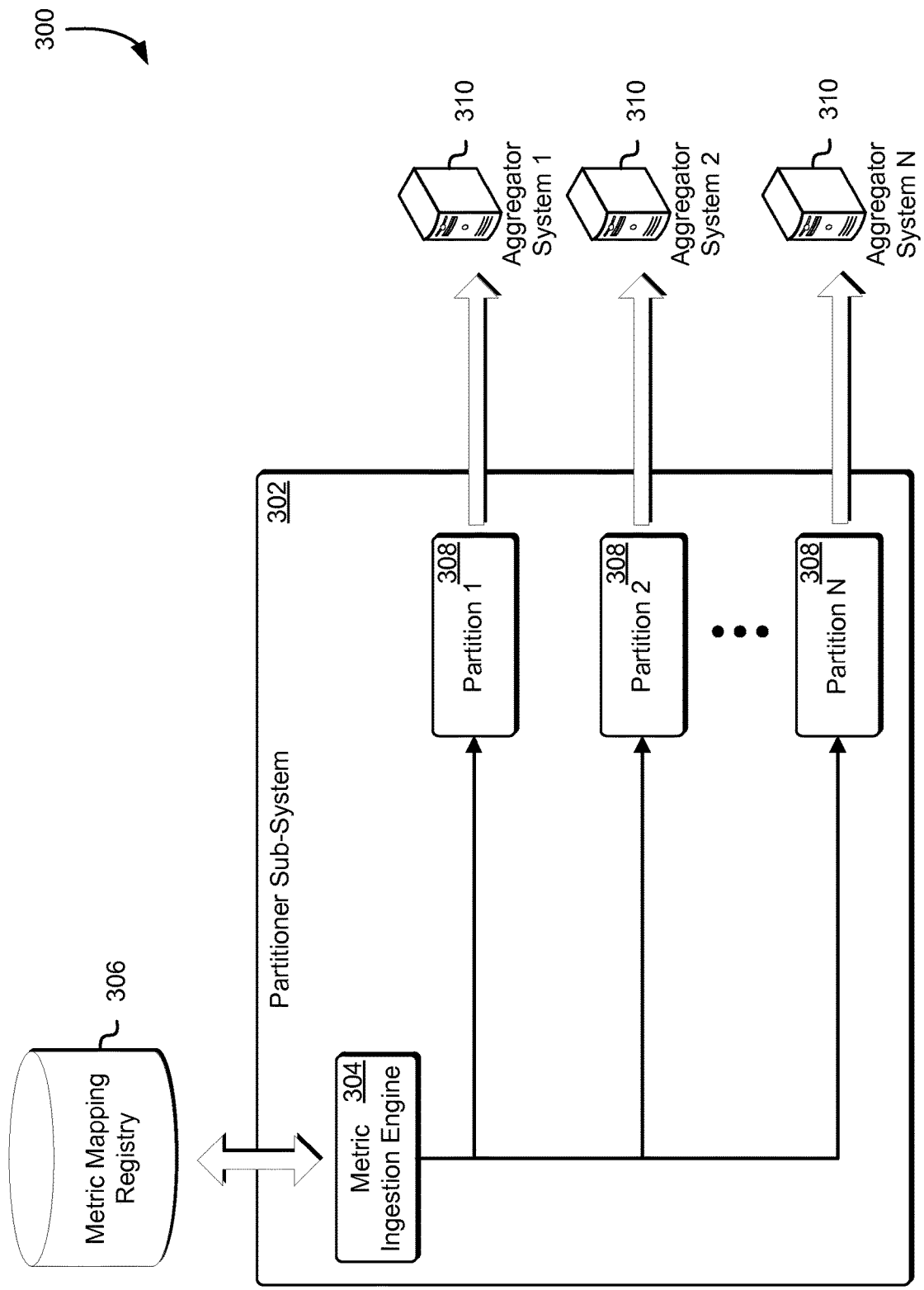
FIG. 3 shows an illustrative example of an environment in which a partitioner sub-system of a computing resource monitoring service partitions measurements into various logical partitions and delivers measurements in each logical partition to a corresponding aggregator system in accordance with at least one embodiment.

As noted above, the computing resource monitoring service may include a partitioner sub-system configured to store a plurality of measurements within one or more logical partitions based at least in part on the storage class of the measurements. A partitioner sub-system may include one or more computer systems that are collectively configured to publish measurements from customer computer systems to aggregator systems for archival storage. Accordingly, FIG. 3 shows an illustrative example of an environment 300 in which a partitioner sub-system 302 of a computing resource monitoring service partitions measurements from various customer computer systems into various logical partitions 308 and delivers measurements from each logical partition 308 to one or more aggregator systems 310 in accordance with at least one embodiment. The partitioner sub-system 302 may include a metric ingestion engine 304, which may be a module of the one or more computer systems of the partitioner sub-system 302 that is configured to obtain serialized measurements from the front-end server.

The metric ingestion engine 304 may access the metric mapping registry 310 to determine a method for partitioning the obtained measurements from the front-end server into one or more logical partitions for storage in the one or more archival storage clusters. For instance, the metric ingestion engine 304 may utilize the metric mapping registry 306 to obtain a mapping of logical partitions to archival storage clusters for a particular retention period. The metric ingestion engine 304 may partition the received measurements into one or more logical partitions based at least in part on the received identifier for each measurement, the timestamp of each measurement, the storage class of each measurement, and the available archival storage clusters as defined by the metric mapping registry 306 through the mapping.

The identifier, as noted above, may be a hash of the metadata for a measurement. A portion of the identifier may be used to determine the logical partition for the associated metric, while another portion of the identifier may be used for identification of the measurement within a logical partition. The partitioning of the measurements may be performed with consistent hashing to minimize the amount of measurements that are transmitted between archival storage clusters as these clusters are added or removed from the computing resource monitoring service. The partitioning of the measurements may also be based at least in part on the measurement timestamp for each measurement to eliminate any impact due to clock skew.

As noted above, the one or more aggregator systems 310 may be configured to ingest measurements recorded over a particular period of time. Each aggregator system 310 may actively compete with the other aggregator systems maintained by the computing resource monitoring service to obtain a measurement storage job from the partitioner sub-system 302. For instance, when the metric ingestion engine 304 partitions the measurements into the one or more logical partitions 308, the metric ingestion engine 304 may generate one or more measurement storage jobs that may be placed in a priority queue. These operations may be prioritized in a manner such that older measurements are processed and stored within the archival storage clusters first. In an embodiment, the one or more aggregator systems 310 will evaluate the priority queue such that an aggregator system available to process measurements in a logical partition 308 can obtain a measurement storage job from the queue and aggregate the measurements for storage in the corresponding archival storage cluster.

In an embodiment, if two or more aggregator systems obtain the same measurement storage job from the priority queue, the two or more aggregator systems will perform the same function and store the measurements from the logical partition in the archival storage cluster. However, when an aggregator system updates the index to indicate presence of the aggregated measurements within the archival storage cluster, the other aggregator systems that have performed the same function may determine that the index has already been updated. This may cause the other aggregator systems to discard (e.g., delete or otherwise deallocate memory used to store) the aggregated measurements they have generated as the archival storage cluster may already have stored the same aggregated measurements therein. Alternatively, if the other aggregator systems instead overwrite the aggregated measurements with the aggregated measurements they have generated, the aggregated measurements may still be the same and the index may still indicate the correct storage location for these aggregated measurements.

Figure 4:
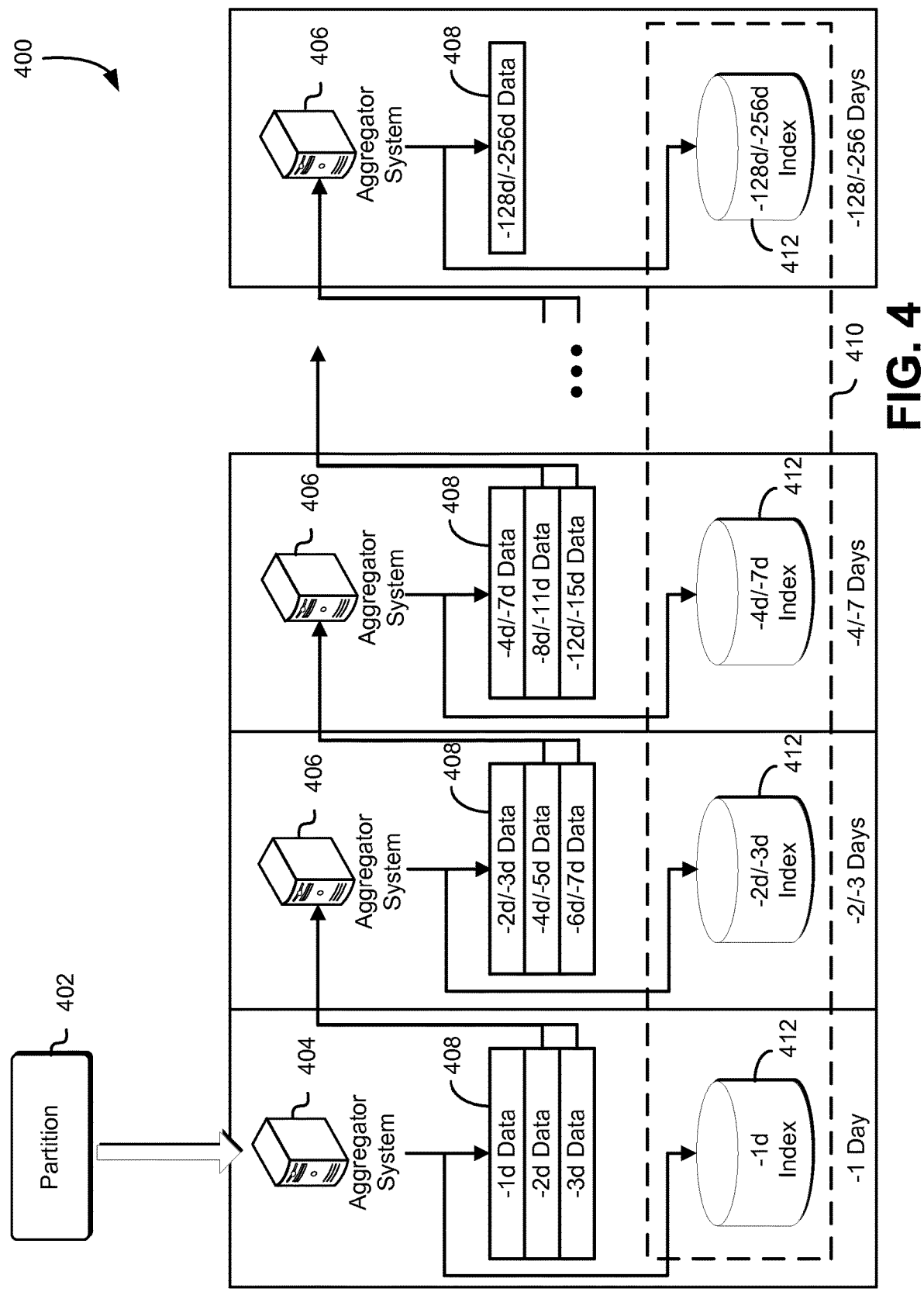
FIG. 4 shows an illustrative example of an environment in which one or more aggregator systems aggregate measurements for a metric from a logical partition based at least in part on timestamps of the data in accordance with at least one embodiment.

As an aggregator system obtains measurements from a logical partition, the aggregator system may aggregate, in memory, the various measurements and store these measurements within an archival storage cluster. Further, the aggregator system may update or generate an index that may be used to specify where, within the archival storage cluster, the aggregated measurements are stored. Accordingly, FIG. 4 shows an illustrative example of an environment 400 in which one or more aggregator systems 404, 406 aggregate measurements for a metric from a logical partition 402 based at least in part on timestamps of the data in accordance with at least one embodiment. In the environment 400, an aggregator system 404 may obtain a measurement storage job from a priority queue maintained by the partitioner sub-system described above. The measurement storage job may specify an identifier of a logical partition 402 that includes a variety of measurements for a metric that need to be stored within a corresponding archival storage cluster 410. The measurement storage job may further specify which archival storage cluster 410 is to be utilized for the storage of the provided measurements.

In an embodiment, the aggregator system 404 will ingest, from the logical partition 402, measurements for a metric received during a particular time interval. The aggregator system 404 may aggregate, in memory, these measurements into a number of data points. These data points may correspond to particular time intervals and may comprise various measurements ingested from the logical partition 402. The aggregator system 404 may generate a data segment comprising these data points comprising measurements for spanning a time period. For instance, the aggregator system 404 may be configured to generate a data segment 408 comprising measurements obtained over a particular time interval. For example, as illustrated in FIG. 4, the aggregator system 404 may generate data segments 408 comprising measurements obtained over one day intervals.

The aggregator system 404 may further update or maintain an index 412 within the archival storage cluster 410 corresponding to the current data segment for the time interval that it is responsible for. For instance, as illustrated in FIG. 4, the aggregator system 404 may maintain an index 412 corresponding to a one day interval from the present time. This index 412 may specify where the measurements corresponding to the data segment 408 are stored within the archival storage cluster 410. The aggregator system 404 may update the index 412 when a new data segment is generated such that the index 412 may indicate where the measurements pertaining to the particular time interval is stored. Older entries within the index 412 may be removed. For instance, when a new data segment 408 (e.g., −1d Data) is generated, entries for older data (e.g., −2d Data, −3d Data) may still be available through older indices. In an embodiment, the aggregator system 404 may maintain the most current index and any older indices corresponding to older data segments that have yet to be processed by a secondary aggregator system 406 to generate larger data segments. When a secondary aggregator system 406 has merged the older data segments into a larger data segment and has generated a new index or updated an existing index to indicate storage of this larger data segment, the aggregator system 404 may remove the older indices corresponding to these older data segments and the older data segments themselves from the archival storage cluster 410. Thus, if a secondary aggregator system 406 has not merged older data segments into a larger data segment, a metric consolidation engine, as will be described in greater detail below, may still obtain the measurements in these older data segments as the indices may still be available until the merging of the older data segments is performed by a secondary aggregator system 406.

In an embodiment, the computing resource monitoring service may maintain one or more secondary aggregator systems 406 configured to merge older data segments 408 from the aggregator system 404 or other secondary aggregator systems to generate larger data segments. For instance, a secondary aggregator system 406 may obtain older data segments 408 for two or more consecutive time periods and merge these older data segments 408 into a larger data segment corresponding to the two or more consecutive time periods. The secondary aggregator system 406 may further generate a distinct index 412 that may correspond to this longer time period such that the new data segment corresponding to this longer period of time can be located within the archival storage cluster 410. Similarly, other secondary aggregator systems 406 may continue to obtain older data segments 408 and merge these data segments into larger data segments until a maximum retention period is reached. For instance, as illustrated in FIG. 4, the computing resource monitoring service may maintain a number of secondary aggregator systems 406 configured to continuously merge older data segments into larger segments until a final data segment is generated that spans a time period to the maximum possible retention period. Any measurements or data segments that exceed this maximum retention period may be purged from the archival storage system 410 or transferred to another storage system.

Figure 5:
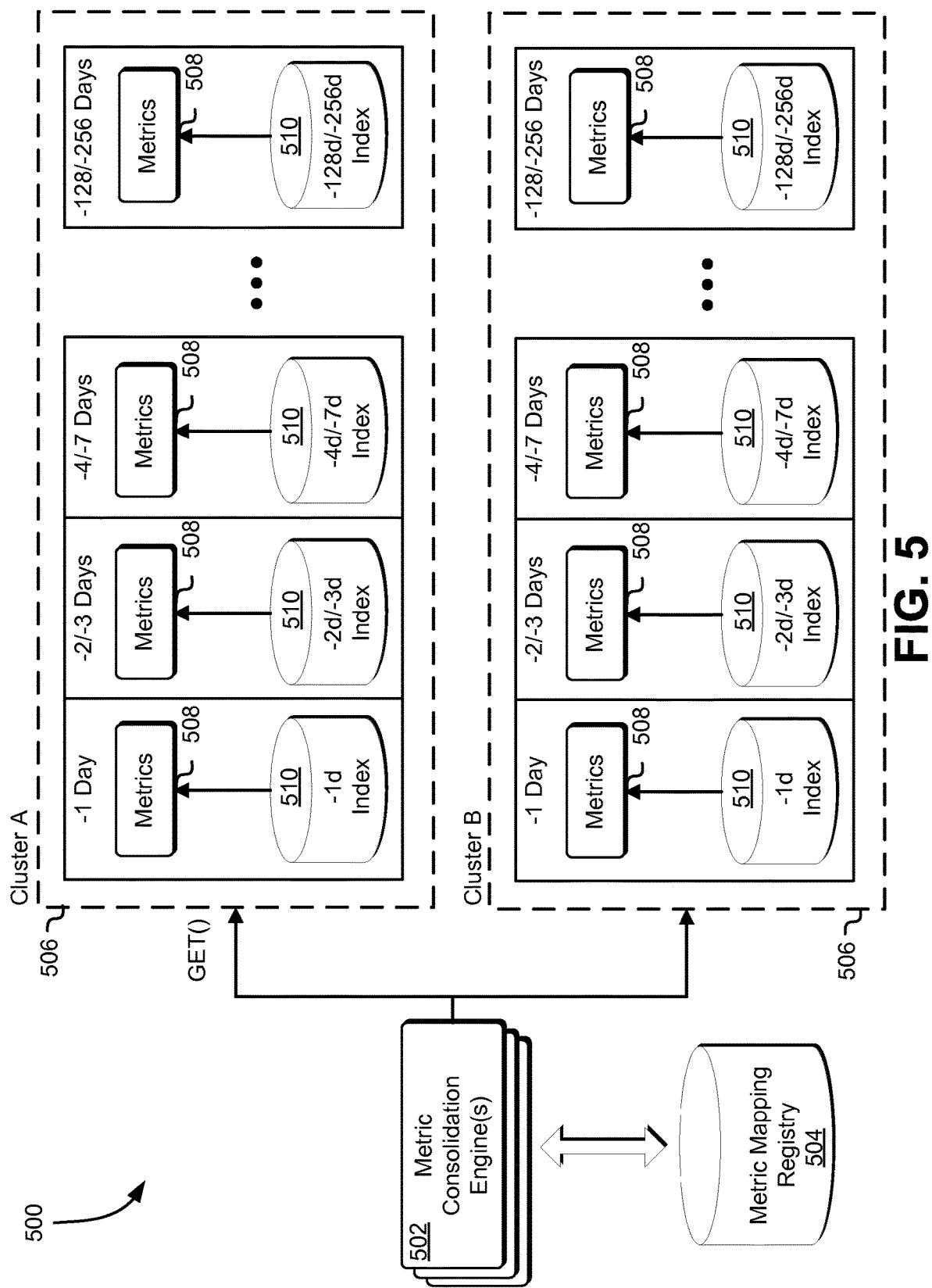
FIG. 5 shows an illustrative example of an environment in which data is obtained from one or more archival storage clusters in response to a customer request to obtain measurements for a metric in accordance with at least one embodiment.

As noted above, the computing resource monitoring service may include one or more metric consolidation engines configured to obtain measurements from the archival storage clusters in response to one or more GET API calls from a customer of the computing resource service provider. Accordingly, FIG. 5 shows an illustrative example of an environment 500 in which data is obtained from one or more archival storage clusters 506 in response to a customer request to obtain measurements for a metric in accordance with at least one embodiment. In the environment 500, one or more metric consolidation engines 502 may obtain from the front-end server a query, along with the identifier usable to locate the requested measurements, to obtain the measurements required to fulfill a GET request received by the front-end server from a customer of the computing resource monitoring service. In response to the query, the one or more metric consolidation engines 502 may access the metric mapping registry 504 to determine where the measurements needed to fulfill the GET request are stored. Each metric consolidation engine 502 may correspond to one or more archival storage clusters 506. For instance, when the front-end server receives the GET request from a customer, the front-end server may use the identifier and a mapping from the metric mapping registry 504 to identify the one or more metric consolidation engines 502 corresponding to the archival storage clusters 506 that have stored the requested measurements.

In order to determine the archival storage clusters 506 that have the measurements necessary to fulfill the GET request, the metric consolidation engines 502 may provide the identifier to the metric mapping registry 504. The metric mapping registry 504 may analyze the current mapping and past mappings for a number of retention periods to determine where the measurements are stored. Once the metric consolidation engines 502 determine, based at least in part on the information provided by the metric mapping registry 504, the archival storage clusters 506 where the measurements are stored, the metric consolidation engine 502 may access the archival storage clusters 506 to obtain the requested measurements. For instance, a metric consolidation engine 502 may utilize the mapping from the metric mapping registry 504 to identify the indices 510 from the various aggregator systems. These indices may be used to determine where the data segments 508 including the requested measurements are stored within the archival storage clusters 506. The indices 510 may specify where the data segments generated by the aggregator systems are stored within the archival storage clusters 506. As noted above, these data segments may have varying size as older data segments may correspond to a longer time interval. For instance, data segments may be exponentially larger over time as secondary aggregator systems merge measurements for consecutive time periods into larger data segments. The one or more metric consolidation engines 502 may utilize this information to obtain the requested measurements.

A metric consolidation engine 502 may utilize the information specified within the various indices 510 to locate and obtain the requested measurements. The metric consolidation engines 502 may compile these obtained measurements from the various archival storage clusters 506 into a measurement response that may be provided to the front-end server in response to the query. The front-end server may utilize this measurement response from the metric consolidation engine 502 to provide the requested measurements to the customer, fulfilling the GET request from the customer.

Figure 6:
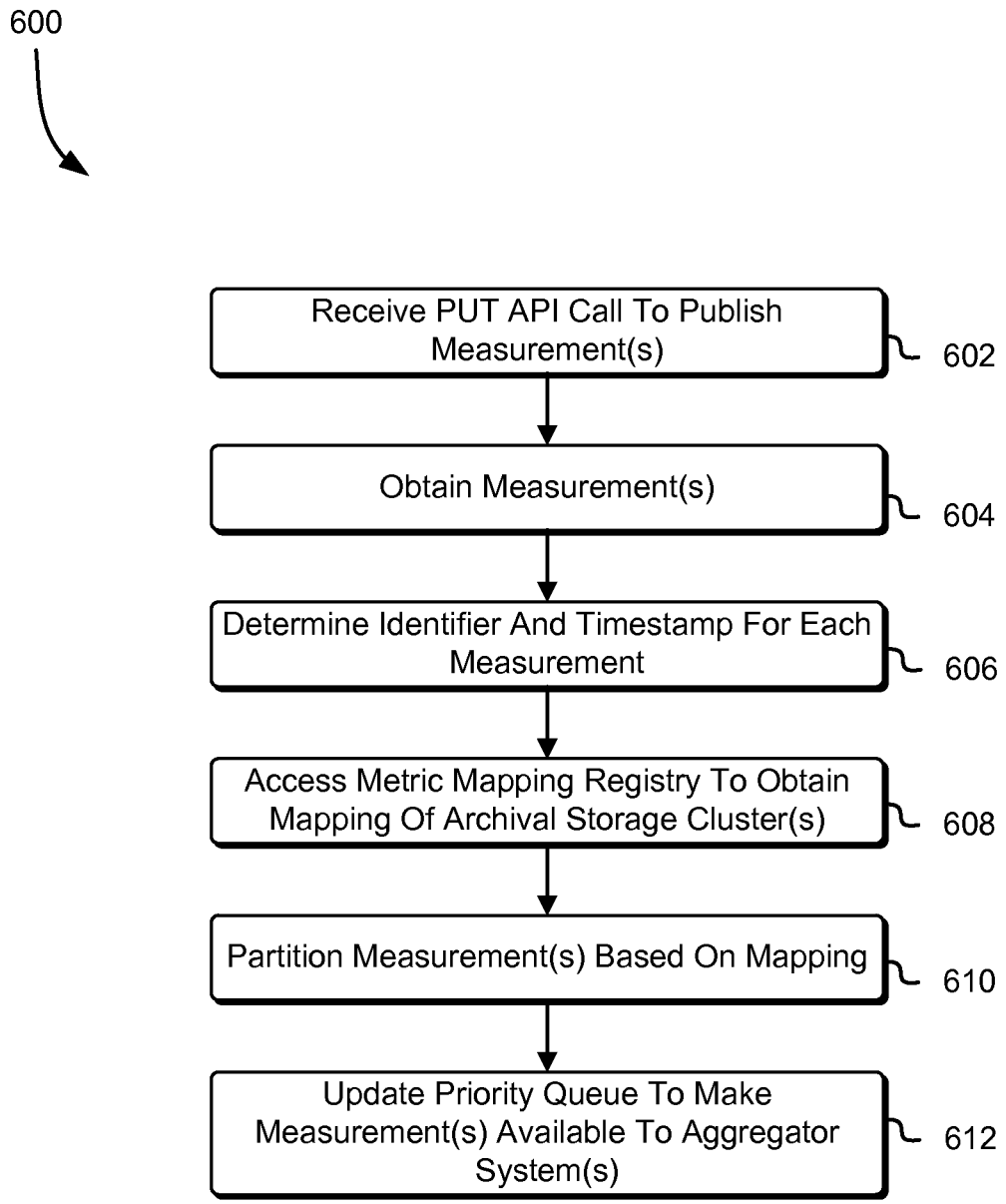
FIG. 6 shows an illustrative example of a process for partitioning measurements for a metric for delivery to one or more aggregator systems in accordance with at least one embodiment.

As noted above, a computing resource monitoring service may include a partitioner sub-system, which may serve as an entry point for the publication of measurements for various metrics. The partitioner sub-system may obtain measurements from a front-end server and split these measurements into logical partitions based at least in part on the received identifier for each measurement, the timestamp of each measurement, the storage class of each measurement, and the available archival storage clusters as defined by the metric mapping registry through the mapping. The partitioner sub-system may make these logical partitions available to the various aggregator systems to enable the aggregator systems to aggregate the measurements into various data segments that can be stored within the archival storage clusters. Accordingly, FIG. 6 shows an illustrative example of a process 600 for partitioning measurements for a metric for delivery to one or more aggregator systems in accordance with at least one embodiment. The process 600 may be performed by the aforementioned partitioner sub-system, which may be configured to partition measurements into one or more logical partitions. Further, the partitioner sub-system may maintain a priority queue that may be used to provide measurement storage jobs to the various aggregator systems of the computing resource monitoring service. Some actions of the process 600 may be performed by a front-end server, which may be configured to obtain PUT API calls from various customers for storage of their measurements within one or more archival storage clusters.

At any point, the front-end server may receive 602, from a customer computer system or other computing resource, a PUT API call to publish a measurement within an archival storage cluster. The PUT API call may include the measurement to be stored as well as metadata for the particular measurement. The metadata may specify one or more metric attributes for the measurement. For instance, the metadata may uniquely identify the measurement by a combination of a customer account number, the namespace (e.g., associated service for the computing resource), the dimensions for the measurement (e.g., key/value pairs), the name of the measurement itself, and the like. Thus, the front-end server may obtain 604, from the PUT API call, the measurement that is to be stored within an archival storage cluster of the computing resource monitoring service.

The front-end server may utilize a hash function and the provided metadata to generate an identifier for the measurement. This identifier may include a multiple-byte hash, wherein a portion of the hash may be used to determine a logical partition for each measurement metric based at least in part on a mapping within a metric mapping registry, while another portion of the hash may be used for unique identification of the measurement once placed within the corresponding logical partition. The front-end server may further transform the measurement into a binary serialization format. The measurement, in this format, may include the identifier, timestamp for the measurement, measurement unit for the measurement, and the measurement itself. The front-end server may transmit this serialized measurement to a partitioner sub-system of the computing resource monitoring service for storage of the measurement.

In response to receiving the serialized measurement from the front-end server, the partitioner sub-system may determine 606 the identifier and timestamp for the measurement. The partitioner sub-system may access 608 the metric mapping registry to obtain a mapping of storage classes for various measurements to logical partitions and corresponding archival storage clusters to determine which logical partition will be used for placement of the measurement and for delivery to an archival storage cluster. For instance, the partitioner sub-system may utilize the identifier and timestamp from the serialized measurement to identify the storage class for the measurement. This storage class may be used to determine which logical partition is to be used for the measurement and the corresponding archival storage cluster to be used to store the measurement once aggregated by an aggregator system.

Based at least in part on the mapping from the metric mapping registry, the partitioner sub-system may partition 610 the provided measurements into the one or more identified logical partitions. For instance, the partitioner sub-system may maintain one or more logical partitions for a plurality of measurements. An administrator of the computing resource monitoring service, an automated process, or an alternative service of the computing resource service provider may update the mapping within the metric mapping registry to associate certain storage classes with particular logical partitions and archival storage clusters. Thus, the partitioner sub-system may identify the corresponding logical partitions for the obtained measurements and add these measurements to the corresponding logical partitions as defined in the mapping.

The partitioner sub-system may additionally update 612 a priority queue to make the measurements in the logical partitions available to the aggregator systems of the computing resource monitoring service. As noted above, each aggregator system may be configured to compete for the measurement storage jobs within this priority queue. For instance, an aggregator system may obtain a measurement storage job from the priority queue if it has sufficient capacity to perform the operations necessary to aggregate, index, and store the various measurements from a logical partition within an archival storage cluster. The priority queue may be updated such that the new measurement storage job is added to the priority queue for processing while older operations in the queue receive priority.

Figure 7:
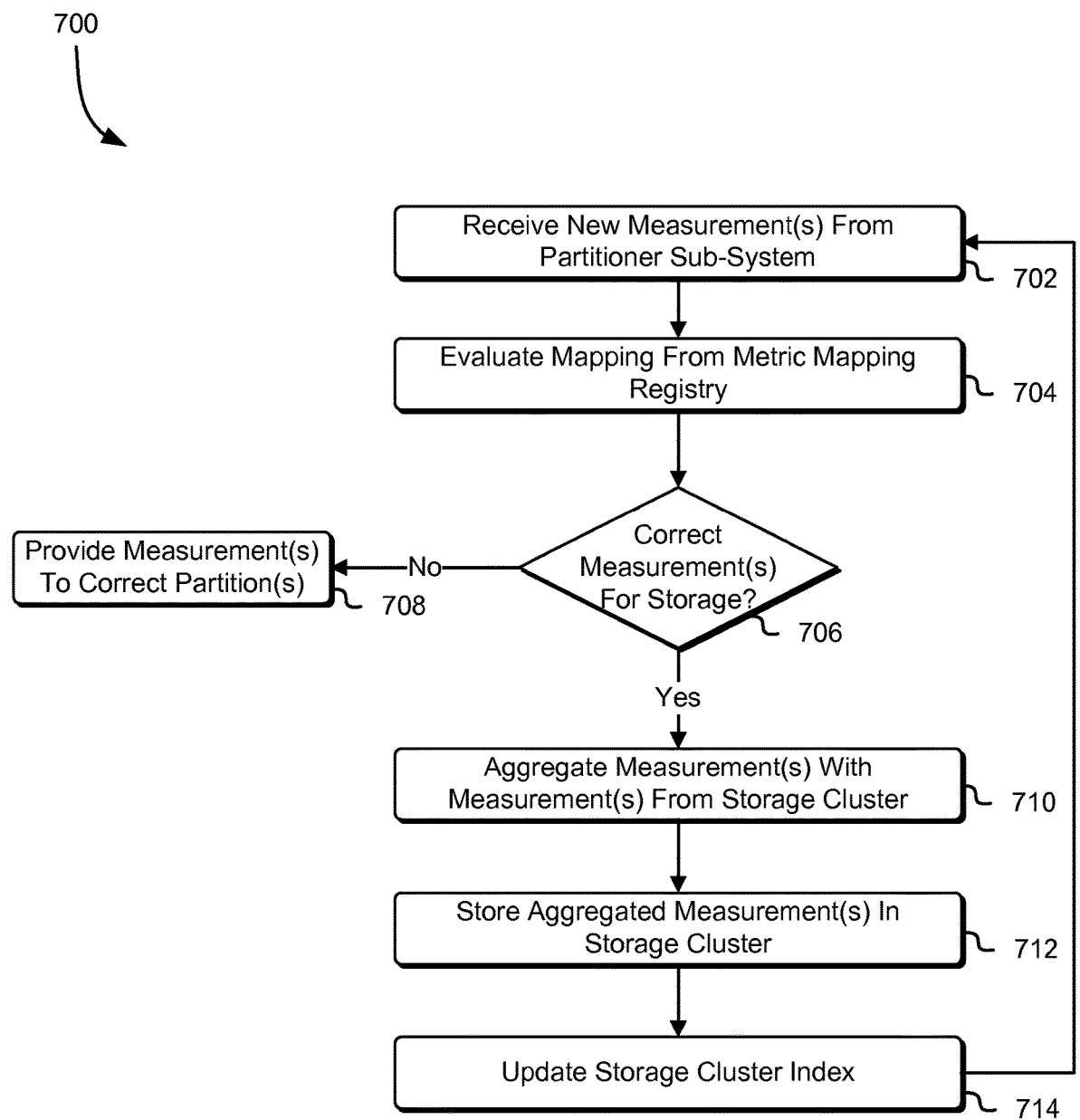
FIG. 7 shows an illustrative example of a process for aggregating measurements from one or more partitioners with measurements from one or more datastores of a computing resource monitoring service in accordance with at least one embodiment.

As noted above, an aggregator system may obtain a measurement storage job from a priority queue to store one or more measurements from a logical partition in an archival storage cluster. The aggregator system may maintain an index for these measurements such that a metric consolidation engine may evaluate the index to determine where in the archival storage cluster the measurements are stored. Accordingly, FIG. 7 shows an illustrative example of a process 700 for aggregating measurements from one or more logical partitions with measurements from one or more datastores of a computing resource monitoring service in accordance with at least one embodiment. The process 700 may be performed by any aggregator system of the computing resource monitoring service. The aggregator system may be configured to interact with a priority queue and one or more logical partitions to obtain measurements for aggregation and storage in one or more archival storage clusters.

In response to obtaining a measurement storage job from the priority queue, an aggregator system may receive 702 one or more new measurements from a partitioner sub-system through one or more logical partitions. The measurement storage job may specify one or more identifiers of the logical partitions that include measurements that are to be stored within one or more archival storage clusters. Further, the operation may specify identifiers for the one or more archival storage clusters that are to be utilized for storage of the measurements from the logical partitions. Thus, the aggregator system may utilize the identifiers of the logical partitions to identify the logical partitions that have the measurements that are to be aggregated, causing the aggregator system to obtain the measurements from the identified logical partitions.

The aggregator system may transmit a request to the metric mapping registry to obtain a mapping of storage classes, logical partitions, and archival storage clusters. In response to obtaining the mapping from the metric mapping registry, the aggregator system may evaluate 704 this mapping to determine 706 whether the measurements obtained from the logical partitions correspond to the identified storage class specified in the mapping. For instance, the mapping may specify, for each pairing of the storage class and metric identifier, a corresponding logical partition identifier. If a measurement was placed in a logical partition erroneously, the metric identifier and storage class of the measurement may be used to identify the mismatch in the mapping. Further, this may enable the aggregator system to identify the correct logical partition in which the measurement should be placed. Thus, if the aggregator system has obtained any erroneous measurements from the logical partitions, the aggregator system may provide 708 these measurements to the partitioner sub-system for placement in the correct logical partitions. Alternatively, the aggregator system may be configured to place these measurements in the correct logical partitions itself.

The aggregator system may aggregate 710 any remaining measurements with other measurements for the metric that may be stored within a corresponding archival storage cluster. For instance, in an embodiment, an aggregator system is configured to be responsible for aggregating measurements into data segments having timestamps spanning a particular time interval. For instance, as illustrated in FIG. 4, the aggregator system may generate data segments corresponding to a day's worth of measurements. Thus, based at least in part on the timestamps of the obtained measurements and the timestamps of the measurements stored within the archival storage cluster, the aggregator system may obtain the data segment corresponding to the time interval that covers these measurements. The aggregator system may then aggregate the obtained measurements with those measurements stored within the data segment and store 712 the aggregated measurements in the archival storage cluster in the form of the data segment. It should be noted that if the obtained measurements correspond to a new time interval for which there is no data segment, the aggregator system may generate a new data segment by aggregating the obtained measurements.

The aggregator system may maintain one or more indices corresponding to the data segments stored within the archival storage cluster. The one or more indices may specify where, within an archival storage cluster the data segments are stored. For instance, if the aggregator system updates a data segment to incorporate the new measurements from the logical partitions, the aggregator system may update 714 the corresponding index to indicate the storage location of the data segment and the measurements included therein. In some embodiments, if the data segment is created in response to the aggregation of the metrics from the logical partitions, the aggregator system will create a new index corresponding to the time interval within which the measurements were recorded by the customer through a resource or some other source.

Figure 8:
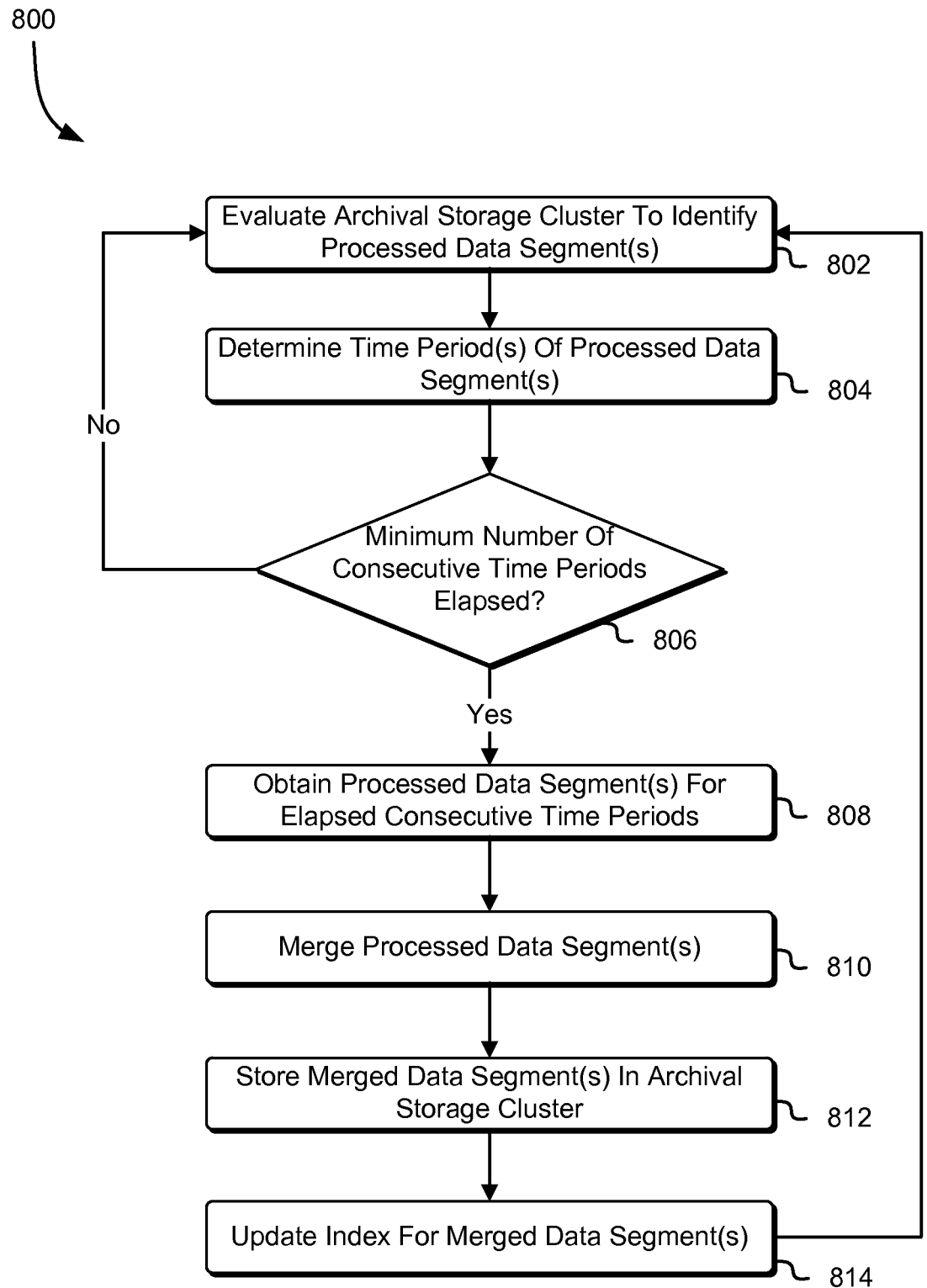
FIG. 8 shows an illustrative example of a process for re-processing measurements for a metric for elapsed consecutive time periods and merging these measurements for storage in an archival storage cluster in accordance with at least one embodiment.

As noted above, the computing resource monitoring service may include one or more secondary aggregator systems configured to re-process data segments from the archival storage cluster from two or more consecutive time periods into a larger data segment that spans the two or more consecutive time periods. This secondary aggregator system may store these larger data segments in the archival storage cluster and maintain its own index corresponding to this longer time interval. Since the secondary aggregator system is configured to re-process existing data segments, the larger data segments generated by the secondary aggregator system may correspond to an older time period than the data segments generated by the aggregator system responsible for aggregating measurements from the logical partitions. Accordingly, FIG. 8 shows an illustrative example of a process 800 for re-processing measurements for a metric for elapsed consecutive time periods and merging these measurements for storage in an archival storage cluster in accordance with at least one embodiment. The process 800 may be performed by any secondary aggregator system configured to re-process older data segments and merge these data segments into larger data segments. The secondary aggregator system may be responsible for a specific time interval that is longer than one or more other secondary aggregators and/or the aggregator system obtaining measurements from the logical partitions.

At any time, a secondary aggregator system may evaluate 802 the archival storage cluster to identify one or more processed data segments. For instance, the secondary aggregator system may evaluate indices corresponding to the time interval for which the secondary aggregator is responsible for to determine whether any of these indices correspond to time periods beyond the responsibility of the aggregator system before it. For example, as illustrated in FIG. 4, a secondary aggregator system responsible for maintaining a −2d/−3d index may evaluate the indices of the aggregator system (e.g., −1d index) to determine if there are any data segments corresponding to a time period beyond the −1 day limit for the original aggregator system. Thus, the secondary aggregator system may determine 804 the time periods of any processed data segments to identify the data segments corresponding to time period beyond the responsibility limit of a previous aggregator system.

Based at least in part on this determination, the secondary aggregator system may determine 806 whether a minimum number of consecutive time periods have elapsed for these data segments. If the minimum number of consecutive time periods have not elapsed, the secondary aggregator system may continue to evaluate 802 the archival storage cluster to identify any newly available data segments that have time periods beyond the time period for which the previous aggregator system or other secondary aggregator system is responsible for. However, if the minimum number of consecutive time periods has elapsed, the secondary aggregator system may obtain 808 the processed data segments corresponding to these consecutive time periods from the archival storage cluster.

The secondary aggregator system may merge 810 the processed data segments into a larger data segment corresponding to the time interval for which the secondary aggregator system is responsible. For instance, if the secondary aggregator system is responsible for measurements spanning a two-day interval that are older than two days but more recent that three days, the secondary aggregator system may merge the data segments for this two-day interval into a single data segment that spans this two-day interval. The secondary aggregator system may further perform additional backfill aggregation required in memory and generate the longer data segments for each metric. The secondary aggregator may subsequently store 812 the newly created data segment in the archival storage cluster and update 814 its own index to indicate where within the archival storage cluster the longer data segment is stored.

Figure 9:
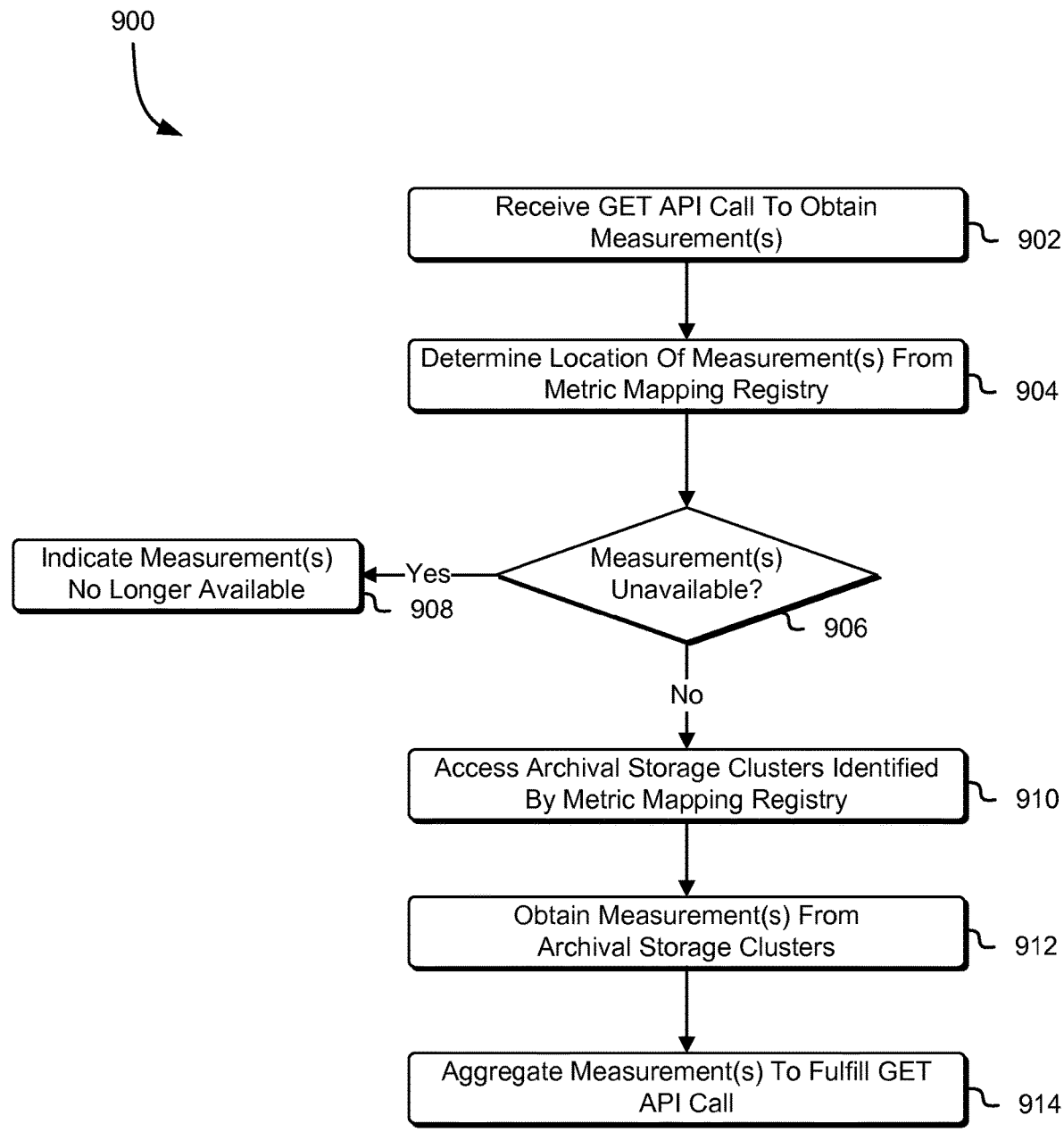
FIG. 9 shows an illustrative example of a process for retrieving one or more measurements from one or more archival storage clusters in response to a GET application programming interface call in accordance with at least one embodiment.

As noted above, the front-end server of a computing resource monitoring service, in conjunction with the metric consolidation engine of the service, may process and fulfill GET requests from customer computer systems and/or other computing resources. For instance, in response to a GET request, the metric consolidation engine may obtain measurements necessary to fulfill the request from one or more archival storage clusters as specified within the metric mapping registry and compile these measurements for delivery to the requesting entity. Accordingly, FIG. 9 shows an illustrative example of a process 900 for retrieving one or more measurements from one or more archival storage clusters in response to a GET application programming interface call in accordance with at least one embodiment. The process 900 may be performed by the front-end server, which may obtain the GET requests from various entities, and a metric consolidation engine, which may obtain the measurements and compile these measurements for delivery to the requesting entities.

At any point, a front-end server of the computing resource monitoring service may receive 902 a GET API call to obtain one or more measurements from the computing resource monitoring service. The GET API call may include metadata for the measurements to be obtained. The front-end server may utilize a hash function and the metadata to generate one or more identifiers for measurements to be obtained from one or more aggregator datastores of the computing resource monitoring service. The front-end server may access the metric mapping registry and utilize the one or more identifiers to determine 904 the location for each of the requested measurements.

Once the front-end server has obtained the location for each of the requested measurements, the front-end server may determine 906 whether any of the requested measurements are no longer available within the archival storage clusters or are otherwise no longer stored within the one or more archival storage clusters of the computing resource monitoring service due to expiration of the measurements. For instance, after a maximum retention period, the aggregator systems of the computing resource monitoring service may no longer generate indices for time periods beyond this maximum retention period. Thus, an index may not be available for measurements corresponding to time intervals extending beyond this maximum retention period. In other instances, the archival storage clusters may be configured to delete data segments that are older than a configuration retention limit. If it is determined that one or more measurements are no longer available due to the lack of an index specifying a location of the measurements or due to the deletion of these measurements, the front-end server may indicate 908, to the requesting entity, that these one or more measurements are no longer available from the one or more archival storage clusters. If these measurements have been moved to an alternative datastore, such as an archival datastore for older data, the front-end server may transmit a request to a computer system of the archival datastore to retrieve the expired measurements.

Once the front-end server has determined the location of any unexpired measurements within the one or more archival storage clusters, the front-end server may cause a metric consolidation engine to access 910 the one or more archival storage clusters specified within the metric mapping registry to obtain 912 the one or more measurements from the archival storage clusters, the measurements being necessary to fulfill the GET request. The metric consolidation engine may aggregate 914 and compile the measurements from the one or more archival storage clusters in order to fulfill the GET request.

Figure 10:
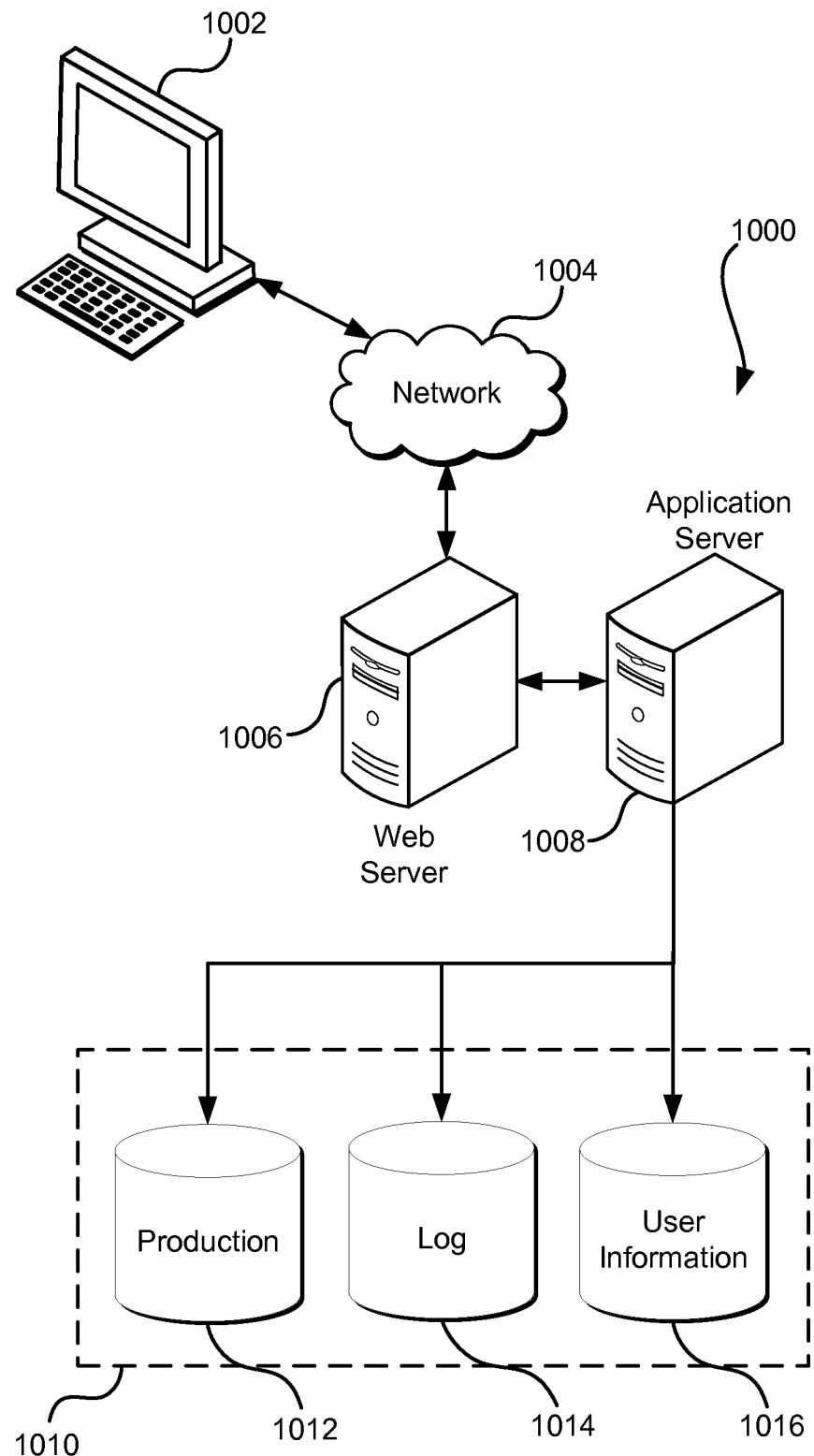
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein

What is claimed is:

1. A system, comprising:
one or more processors; and
memory including instructions that, when executed by the one or more processors, cause the system to implement at least:
a first aggregator system that:
obtains a measurement storage job from a queue, the measurement storage job specifying an identifier of a logical partition of a plurality of logical partitions storing first measurements associated with a metric of a computing resource;
obtains the first measurements from the logical partition;
obtains a mapping of the plurality of logical partitions to storage classes and archival storage resources;
determines, based on the mapping, a storage class for each measurement of the first measurements and an archival storage resource;
aggregates the first measurements with second measurements associated with the metric of the computing resource from the archival storage resource, the first measurements and the second measurements sharing a first particular time interval within a maximum retention time interval associated with the storage class;
generates a data segment for the first particular time interval, the data segment comprising the first measurements and the second measurements;
stores the data segment in the archival storage resource; and
updates an index to indicate a storage location of the data segment in the archival storage resource and the first particular time interval; and
a second aggregator system that:
accesses the index to determine whether two or more data segments, each having a corresponding particular time interval, have corresponding particular time intervals that are consecutive and outside the maximum retention time interval associated with the storage class,
obtains the two or more data segments;
merges the two or more data segments into a second data segment, the second data segment associated with the consecutive corresponding particular time intervals;
stores the second data segment in the archival storage resource; and
updates a second index to indicate a storage location of the second data segment in the archival storage resource.

2. The system of claim 1, wherein the first aggregator system further:
evaluates the index to determine whether the data segment has been previously stored in the archival storage resource by another aggregator system; and
as a result of the data segment being stored in the archival storage resource by the other aggregator system, stores the data segment in the archival storage resource without updating the index.

3. The system of claim 1, wherein the first aggregator system obtains the mapping of the plurality of logical partitions to storage classes from a metric mapping registry, and wherein the first aggregator system further:
determines, based at least in part on the storage class and the mapping, whether each measurement of the first measurements is assigned to the archival storage resource; and
provides any measurements of the first measurements assigned to an alternative archival storage resource to another logical partition based at least in part on the mapping.

4. The system of claim 1, wherein the first measurements and second measurements are aggregated into one or more data points associated with one or more sub-intervals of the maximum retention time interval.

5. A computer-implemented method, comprising:
obtaining first measurements associated with a metric of a computing resource;
obtaining a mapping of the first measurements to a storage class and a storage resource;
aggregating the first measurements with second measurements associated with the metric of the computing resource from the storage resource;
generating a data segment comprising the first measurements and the second measurements, the data segment associated with a time interval determined from the storage class;
storing the data segment in the storage resource;
updating an index to indicate a storage location of the data segment in the storage resource;
accessing the index to determine whether two or more data segments for consecutive time periods are outside a maximum retention time interval of the storage class;
obtaining the two or more segments from the storage resource;
merging the two or more segments into a second data segment associated with the consecutive time periods; and
storing the second data segment in the storage resource.

6. The computer-implemented method of claim 5, further comprising:
obtaining a job from a queue, the job specifying an identifier of a partition;
from the mapping, determining an identifier of the storage resource for storage of the first measurements; and
accessing the partition specified in the job to obtain the first measurements.

7. The computer-implemented method of claim 5, further comprising:
obtaining third measurements;
determining a storage class for the third measurements;
obtaining, from a metric mapping registry, a mapping of storage classes to partitions and storage resources;
utilizing the mapping to determine whether the third measurements is assigned to the storage resource; and
as a result of the third measurements not being assigned to the storage resource, transmitting the third measurements to another partition based at least in part on the mapping.

8. The computer-implemented method of claim 5, further comprising:

generating a second data segment comprising third measurements;
evaluating the index to determine whether the index specifies a storage location for another data segment comprising the third measurements; and
as a result of the index specifying the storage location for the other data segment, storing the second data segment in the storage resource without updating the index to indicate where the second data segment is stored.

9. The computer-implemented method of claim 5, wherein the index corresponds to a specific time interval such that data segments associated with a different time interval than the specific time interval are made available for aggregation with other data segments to create second data segments.

10. The computer-implemented method of claim 5, wherein the first measurements and the second measurements are aggregated into a plurality of data points, whereby data points of the plurality of data points are associated with a sub-interval of the time interval.

11. The computer-implemented method of claim 5, wherein the index is used by a metric consolidation engine to obtain the data segment in response to requests to retrieve the first measurements and the second measurements.

12. A non-transitory computer-readable storage medium having stored thereon executable instructions that, as a result of being executed by one or more processors of a computer system, cause the computer system to at least:
obtain a first set of measurements associated with a metric of a computing resource and a storage class;
obtain a mapping of storage classes to partitions and storage resources;
determine, based on the mapping, a storage resource;
generate a data segment comprising the first set of measurements and a second set of measurements associated with the metric of the computing resource from the storage resource, the data segment associated with a time period during which the first set of measurements and the second set of measurements were recorded;
store the data segment in the storage resource;
update an index to indicate that the data segment is stored in the storage resource;
determine whether any data segments stored within the storage resource have corresponding time periods that exceed a maximum retention period for the storage class; and
transfer one or more data segments to an alternative data store based at least in part on the determination.

13. The non-transitory computer-readable storage medium of claim 12, wherein the instructions further cause the computer system to:
obtain the second set of measurements from the storage resource; and
aggregate the first set of measurements and the second set of measurements to generate the data segment.

14. The non-transitory computer-readable storage medium of claim 12, wherein the instructions further cause the computer system to:
obtain a third set of measurements, the third set of measurements being associated with a second storage class;
obtain a second mapping of storage classes to partitions and storage resources;
determine, based at least in part on the second storage class and the second mapping, whether the third set of measurements correspond to the storage resource; and
as a result of the third set of measurements not being associated with the storage resource, store the third set of measurements in an alternative partition based at least in part on the second mapping.

15. The non-transitory computer-readable storage medium of claim 12, wherein the instructions further cause the computer system to:
obtain, from the storage resource, two or more data segments associated with consecutive time periods;
merge the two or more data segments to generate a second data segment associated with the consecutive time periods; and
store the second data segment in the storage resource.

16. The non-transitory computer-readable storage medium of claim 12, wherein the instructions further cause the computer system to access a partition specified within a job obtained from a queue of jobs to obtain the first set of measurements.

17. The non-transitory computer-readable storage medium of claim 12, wherein the instructions further cause the computer system to aggregate the first set of measurements and the second set of measurements into a plurality of data points such that data points of the plurality of data points are associated with sub-periods of the time period.

18. The non-transitory computer-readable storage medium of claim 12, wherein:
the index corresponds to a specific time period for arrival of measurements; and
the instructions further cause the computer system to make available data segments associated with time periods other than the specific time period for aggregation with other data segments for creation of larger data segments.

* * * * *